(12) United States Patent
Quigley (10) Patent No.: US 10,277,130 B2
(45) Date of Patent: Apr. 30, 2019

(54) PRIMARY-SIDE START-UP METHOD AND CIRCUIT ARRANGEMENT FOR A SERIES-PARALLEL RESONANT POWER CONVERTER

(71) Applicant: Microchip Technology Incorporated, Chandler, AZ (US)

(72) Inventor: Thomas Quigley, Newark Valley, NY (US)

(73) Assignee: MICROCHIP TECHNOLGOY INCORPORATED, Chandler, AZ (US)

( * ) Notice: Subject to any disclaimer, the term of this patent is extended or adjusted under 35 U.S.C. 154(b) by 347 days.

(21) Appl. No.: 15/168,569

(22) Filed: May 31, 2016

(65) Prior Publication Data
US 2016/0352231 A1    Dec. 1, 2016

Related U.S. Application Data (60) Provisional application No. 62/169,382, filed on Jun. 1, 2015.

(51) Int. Cl.
*H02M 3/335* (2006.01)
*H02M 1/36* (2007.01)
(Continued)

(52) U.S. Cl.
CPC ......... *H02M 3/33507* (2013.01); *H02M 1/32* (2013.01); *H02M 1/36* (2013.01);
(Continued)

(58) Field of Classification Search
CPC .............................. H02M 3/335; H02M 3/337
(Continued)

(56) References Cited

U.S. PATENT DOCUMENTS

| 4,967,332 A | 10/1990 | Claydon et al. ................ 363/17 |
| 5,301,095 A * | 4/1994 | Teramoto ............ H02M 1/4258 363/21.07 |

(Continued)

FOREIGN PATENT DOCUMENTS

| DE | 102008027054 A1 | 1/2009 | ............... H02M 3/28 |
| EP | 0618665 A2 | 10/1994 | ............... H02M 3/28 |
| EP | 2775602 A2 | 9/2014 | ............ H02M 3/156 |

OTHER PUBLICATIONS

On Semiconductor, "NCP1249A/B + NCP4355B: Very Low No-Load Power Consumption Flyback Converter with Peak Power Excursion Evaluation Board User's Manual," XP055312861, URL: http://www.onsemi.com/pub/Collateral/EVBUM2221-D.pdf, 30 pages, Apr. 30, 2014.

(Continued)

*Primary Examiner* — Fred E Finch, III
*Assistant Examiner* — Nusrat Quddus
(74) *Attorney, Agent, or Firm* — Slayden Grubert Beard PLLC (57) ABSTRACT

A series-parallel resonant power converter comprises a primary-side start-up controller and a secondary-side controller, wherein the primary-side start-up controller sends power to the secondary-side controller when power (voltage) is first applied to the series-parallel resonant power converter. The start-up controller starts up the series-parallel resonant power converter using an open-loop start-up technique wherein the secondary-side closed-loop controller takes over control of the series-parallel resonant power converter once it becomes powered and activated. During light-load or no load conditions, the secondary-side controller sends an off resonance higher frequency or a standby code inhibit (disable) command to the start-up controller. When power needs to be sent to the secondary side of the transformer to charge a secondary side capacitor, the sec- (Continued)

ondary-side controller may send an enable code command to the start-up controller where it is detect to allow the start-up controller to operate in a normal fashion with the secondary side controller.

42 Claims, 3 Drawing Sheets

(51) Int. Cl.
| | | |
|---|---|---|
| H02M 1/32 | (2007.01) | |
| H02M 3/337 | (2006.01) | |
| H02M 1/00 | (2006.01) | |

(52) U.S. Cl.
CPC ....... *H02M 3/337* (2013.01); *H02M 3/33592* (2013.01); *H02M 2001/0006* (2013.01); *H02M 2001/0009* (2013.01); *H02M 2001/0035* (2013.01); *H02M 2001/0058* (2013.01); *Y02B 70/1433* (2013.01); *Y02B 70/1475* (2013.01); *Y02B 70/1491* (2013.01); *Y02B 70/16* (2013.01)

(58) Field of Classification Search
USPC ........................................... 363/21.03–21.18
See application file for complete search history.

(56) References Cited

U.S. PATENT DOCUMENTS

| | | | | |
|---|---|---|---|---|
| 5,498,995 | A | 3/1996 | Szepesi et al. ............... 327/538 |
| 5,757,627 | A | 5/1998 | Faulk .......................... 363/21.14 |
| 6,188,276 | B1 | 2/2001 | Simopoulos .................... 330/10 |
| 6,456,511 | B1 | 9/2002 | Wong .......................... 363/21.13 |
| 6,490,177 | B1* | 12/2002 | Figueroa ............... H02M 3/335 363/131 |
| 6,504,267 | B1 | 1/2003 | Giannopoulos ................. 307/31 |
| 7,746,672 | B2 | 6/2010 | Nishikawa ................. 363/21.16 |
| 9,331,583 | B2 | 5/2016 | Zhang et al. |
| 2001/0043479 | A1 | 11/2001 | Nagai et al. ..................... 363/20 |
| 2002/0006045 | A1 | 1/2002 | Shirai et al. ..................... 363/17 |
| 2002/0125867 | A1 | 9/2002 | Choo et al. ..................... 323/282 |
| 2007/0133234 | A1 | 6/2007 | Huynh et al. .................... 363/20 |
| 2007/0252563 | A1 | 11/2007 | Kumagai et al. ............. 323/267 |
| 2008/0259655 | A1 | 10/2008 | Wei et al. .................. 363/21.18 |
| 2008/0265133 | A1 | 10/2008 | Sawtell et al. ................ 250/206 |
| 2009/0010027 | A1 | 1/2009 | Nishikawa ................. 363/21.01 |
| 2009/0261790 | A1 | 10/2009 | Arduini ......................... 323/266 |
| 2009/0273324 | A1 | 11/2009 | Okamoto et al. ............. 323/282 |
| 2009/0295346 | A1 | 12/2009 | Matthews ..................... 323/267 |
| 2009/0295349 | A1 | 12/2009 | Tao et al. ...................... 323/282 |
| 2010/0194198 | A1 | 8/2010 | Djenguerian et al. .......... 307/31 |
| 2010/0208500 | A1 | 8/2010 | Yan et al. .................. 363/21.12 |
| 2010/0308875 | A1 | 12/2010 | Fitzgerald .................... 327/142 |
| 2010/0327761 | A1 | 12/2010 | Jin ................................. 315/219 |
| 2011/0019446 | A1 | 1/2011 | Wu et al. .......................... 363/79 |
| 2011/0032732 | A1 | 2/2011 | Hsu ............................. 363/21.14 |
| 2011/0075448 | A1 | 3/2011 | Melanson ........................ 363/20 |
| 2011/0103104 | A1 | 5/2011 | Zhan et al. ................. 363/21.17 |
| 2011/0164437 | A1 | 7/2011 | Sun et al. ......................... 363/16 |
| 2011/0211370 | A1* | 9/2011 | Luo .................... H02M 3/33592 363/21.02 |
| 2011/0305043 | A1 | 12/2011 | Matsumoto ................ 363/21.01 |
| 2012/0099345 | A1 | 4/2012 | Zhao et al. ................. 363/21.05 |
| 2012/0139342 | A1 | 6/2012 | Bailey et al. .................... 307/31 |
| 2012/0139477 | A1 | 6/2012 | Oglesbee et al. ............. 320/107 |
| 2012/0230069 | A1 | 9/2012 | Tzeng et al. ..................... 363/49 |
| 2012/0243271 | A1 | 9/2012 | Berghegger ............... 363/21.15 |
| 2012/0262953 | A1* | 10/2012 | Jungreis ................ H02M 3/285 363/17 |
| 2012/0280642 | A1 | 11/2012 | Lin et al. ................... 318/400.11 |
| 2012/0294048 | A1 | 11/2012 | Brinlee ....................... 363/21.18 |
| 2013/0016535 | A1 | 1/2013 | Berghegger ............... 363/21.15 |
| 2013/0155728 | A1 | 6/2013 | Melanson et al. ......... 363/21.16 |
| 2013/0194020 | A1 | 8/2013 | Shen et al. ...................... 327/333 |
| 2013/0223108 | A1 | 8/2013 | Xu .............................. 363/21.17 |
| 2013/0229829 | A1 | 9/2013 | Zhang et al. .................... 363/16 |
| 2013/0236203 | A1 | 9/2013 | Nakajima et al. ............... 399/88 |
| 2013/0300384 | A1 | 11/2013 | Wang et al. .................... 323/271 |
| 2013/0301308 | A1* | 11/2013 | Hosotani ............ H02M 3/3381 363/21.03 |
| 2014/0028095 | A1 | 1/2014 | Maru et al. ...................... 307/31 |
| 2014/0140107 | A1 | 5/2014 | Chen et al. ................. 363/21.15 |
| 2014/0160810 | A1 | 6/2014 | Zheng ......................... 363/21.17 |
| 2014/0253225 | A1 | 9/2014 | Lee et al. ....................... 327/535 |
| 2014/0253227 | A1 | 9/2014 | Yach et al. ..................... 327/540 |
| 2014/0254214 | A1 | 9/2014 | Balakrishnan et al. ... 363/21.15 |
| 2014/0254215 | A1 | 9/2014 | Brinlee et al. ............. 363/21.15 |
| 2014/0313790 | A1 | 10/2014 | Feng et al. .................. 363/21.02 |
| 2014/0313794 | A1 | 10/2014 | Ono et al. ................... 363/21.15 |
| 2014/0321170 | A1 | 10/2014 | Tumasz ....................... 363/21.09 |
| 2014/0369086 | A1 | 12/2014 | Hayasaki ................... 363/21.14 |
| 2015/0016152 | A1 | 1/2015 | Kojima ....................... 363/21.02 |
| 2015/0023063 | A1* | 1/2015 | Perreault ............... H02M 3/337 363/17 |
| 2015/0091544 | A1 | 4/2015 | Jayaraj et al. ................. 323/284 |
| 2015/0124488 | A1 | 5/2015 | Dai et al. ......................... 363/17 |
| 2015/0280573 | A1 | 10/2015 | Gong et al. ................. 363/21.14 |
| 2015/0280584 | A1 | 10/2015 | Gong et al. ................. 363/21.13 |
| 2016/0079878 | A1 | 3/2016 | Lin et al. ..................... 363/21.14 |
| 2016/0087541 | A1 | 3/2016 | Xie et al. .................... 363/21.06 |
| 2016/0141951 | A1 | 5/2016 | Mao et al. .................. 363/21.02 |
| 2016/0149504 | A1 | 5/2016 | Quigley |
| 2016/0190938 | A1 | 6/2016 | Wang et al. ................ 363/21.12 |
| 2016/0226239 | A1 | 8/2016 | Yang et al. ................. 363/21.15 |
| 2016/0352231 | A1 | 12/2016 | Quigley ..................... 363/21.03 |
| 2016/0352237 | A1 | 12/2016 | Quigley ........................ 363/21.1 |
| 2017/0054376 | A1 | 2/2017 | Quigley |

OTHER PUBLICATIONS

International Search Report and Written Opinion, Application No. PCT/US2016/047949, 15 pages, dated Nov. 8, 2016.
International Search Report and Written Opinion, Application No. PCT/US2016/035139, 13 pages, dated Aug. 30, 2016.
International Search Report and Written Opinion, Application No. PCT/US2016/035149, 13 pages, dated Sep. 9, 2016.
"IEEE 802.3af PD with Current Mode Switching Regulator," Freescale Semiconductor, Document No. MC34670, URL: http://www.nxp.com/files/analog/doc/data_sheet/MC34670.pdf, 24 pages, Dec. 31, 2006.
International Search Report and Written Opinion, Application No. PCT/US2015/061769, 13 pages, dated Mar. 11, 2016.
Microchip Technology Incorporated, "HV9910C: Universal High-Brightness LED Driver," URL: http://ww1.microchip.com/downloads/en/DeviceDoc/20005323A.pdf, 18 pages, Mar. 25, 2014.
U.S. Appl. No. 15/168,390, 23 pages, filed May 31, 2016.
U.S. Notice of Allowance, U.S. Appl. No. 15/812,850, 28 pages, dated Sep. 12, 2018.
European Office Action, Application No. 16732045.6, 7 pages, dated Oct. 2, 2018.
U.S. Non-Final Office Action, U.S. Appl. No. 14/945,729, 36 pages, dated Mar. 29, 2017.
U.S. Notice of Allowance, U.S. Appl. No. 15/241,993, 22 pages, dated Apr. 5, 2017.
U.S. Non-Final Office Action, U.S. Appl. No. 15/168,390, 32 pages, dated Jul. 27, 2017.

* cited by examiner

PRIMARY-SIDE START-UP METHOD AND CIRCUIT ARRANGEMENT FOR A SERIES-PARALLEL RESONANT POWER CONVERTER

RELATED PATENT APPLICATION

This application claims priority to commonly owned U.S. Provisional Patent Application Ser. No. 62/169,382; filed Jun. 1, 2015; and is related to U.S. patent application Ser. No. 14/945,729; filed Nov. 19, 2015; and U.S. Provisional Patent Application Ser. No. 62/169,415; filed Jun. 1, 2015; all by Thomas Quigley, wherein all are hereby incorporated by reference herein for all purposes.

TECHNICAL FIELD

The present disclosure relates to power converters, and, in particular to start-up controller methods and apparatus for DC-to-DC and AC-to-DC series-parallel resonant power converters.

BACKGROUND

Series-parallel resonant power converters are converters where the load can be in series with a resonant "tank" circuit or in parallel with one of the tank circuit components. A series-parallel power converter comprising two inductors (where one of the inductors is the magnetization inductance of a transformer) and a single resonant capacitor is called an "LLC resonant" power converter. The load is in parallel with the magnetization inductance. An "LCC resonant" power converter adds an additional capacitance in parallel with the magnetization inductance and the load. Advantages of the LLC and LCC power converters are when operating above resonance at nominal input voltage the ability to operate at no load to short circuit conditions, operate over a wide input voltage ranges, and achieve zero voltage switching (ZVS) and zero current switching (ZCS) over the entire power converter operating range. Power converters, e.g., DC-to-DC and AC-to-DC, typically have unique circuitry for a proper graceful start-up (soft start) and to develop correct operating voltage biases. This unique circuitry may require custom integrated circuits and/or proprietary designs which may increase the cost and delivery schedule of such power converters.

SUMMARY

Therefore a need exists for a low cost solution to start-up of off-line series-parallel resonant power converters using a conventional, low cost integrated circuit (IC) solution on the primary side that does not duplicate the resources of a secondary side controller and minimizes discrete components required with the primary side electronic devices.

According to an embodiment, a method for starting up a series-parallel resonant power converter may comprise the steps of: applying a first DC voltage to a primary-side start-up controller; turning on and off at least one power switch with the start-up controller at a frequency higher than a resonant frequency of a series-parallel resonant circuit that includes a primary winding of a transformer that may be coupled to at least one power switch; reducing the on and off frequency of the at least one power switch toward the resonant frequency of the series-parallel resonant circuit, whereby an AC voltage may be produced on a secondary winding of the transformer; rectifying the AC voltage from the secondary winding of the transformer with second rectifiers to provide a second DC voltage for powering a secondary-side controller and a load; and transferring control of the at least one power switch from the primary-side start-up controller to the secondary-side controller when the second DC voltage may be at a desired voltage value.

According to a further embodiment of the method, the step of turning on and off the at least one power switch with the start-up controller may be at a fixed higher frequency. According to a further embodiment of the method, the step of turning on and off the at least one power switch with the start-up controller may be at a fixed lower frequency. According to a further embodiment of the method, the step of turning on and off the at least one power switch with the start-up controller may start at a fixed higher frequency and may change to a lower frequency. According to a further embodiment of the method, the step of turning on and off the at least one power switch with the start-up controller may start at a fixed lower frequency and may change to a higher frequency.

According to a further embodiment of the method, the step of transferring control of the at least one power switch from the primary-side start-up controller to the secondary-side controller may comprise the steps of: sending signals from the secondary-side controller to the primary-side start-up controller when the second DC voltage may be at the desired voltage value; detecting the signals from the secondary-side controller with the primary-side start-up controller; and controlling the at least one power switch with the detected signals from the secondary-side controller.

According to a further embodiment of the method, the second DC voltage may be regulated by the secondary-side controller after the primary-side start-up controller detects the signals from the secondary-side controller. According to a further embodiment of the method, the step of sending signals from the secondary-side controller to the primary-side start-up controller may further comprise the step of sending signals through an isolation circuit. According to a further embodiment of the method, the isolation circuit may comprise an optical coupler. According to a further embodiment of the method, the isolation circuit may comprise a pulse transformer. According to a further embodiment of the method, may comprise the step of applying AC power to a first rectifier for providing the first DC voltage. According to a further embodiment of the method, may comprise the step of measuring current of the primary winding of the transformer with a current transformer coupled to a current sense input of the secondary-side controller.

According to a further embodiment of the method, may comprise the step of limiting a maximum allowable transformer primary winding current with the primary-side start-up controller. According to a further embodiment of the method, the second rectifiers may be synchronous rectifiers. According to a further embodiment of the method, the synchronous rectifiers may switch at zero voltage. According to a further embodiment of the method, the synchronous rectifiers may switch at zero current. According to a further embodiment of the method, the at least one power switch may be at least one power metal oxide semiconductor field effect transistor (MOSFET). According to a further embodiment of the method, the series-parallel resonant circuit may comprise one inductor, one capacitor and the primary winding of the transformer in a LLC power converter configuration. According to a further embodiment of the method, the series-parallel resonant circuit may comprise two capacitors, one inductor and the primary winding of the transformer in a LCC power converter configuration.

According to a further embodiment of the method, may comprise the steps of: sending a disable signal from the secondary-side controller to the primary-side start-up controller for inhibiting operation of the power switch when the series-parallel resonant power converter may be entering a standby mode; and sending an enable signal from the secondary-side controller to the primary-side start-up controller for enabling operation of the power switch when the series-parallel resonant power may return to an operating mode. According to a further embodiment of the method, the disable signal may comprise a first coded signal and the enable signal may comprise a second coded signal, wherein the primary-side start-up controller may comprise decoding logic for decoding the first and second coded signals. According to a further embodiment of the method, the enable and disable signals may be at higher frequencies than the pulse control frequencies from the secondary-side controller.

According to a further embodiment of the method, the step of turning on and off the at the least one power switch with the start-up controller may comprise the step of generating a bias voltage from a bias winding of the transformer. According to a further embodiment of the method, the step of transferring control of the at least one power switch from the primary-side start-up controller to the secondary-side controller may comprise the step of the start-up controller accepting switching commands from the secondary-side controller so that the secondary-side controller may control the at least one power switch using the start-up controller in order to achieve substantially linear voltage regulation. According to a further embodiment of the method, the step of turning on and off at the least one power switch with the start-up controller may comprise the step of turning on and off the at least one power switch when the start-up controller may be in an open loop mode. According to a further embodiment of the method, the start-up controller may provide over-voltage and under-voltage protection, and a maximum current limit through the transformer primary. According to a further embodiment of the method, a tertiary winding voltage from the transformer may be coupled to the start-up controller and may enable the start-up controller to regulate the secondary-side voltage in the event the secondary-side controller fails to operate correctly According to another embodiment, a series-parallel resonant power converter may comprise: a primary-side start-up controller coupled to a first DC voltage; at least one power switch coupled to the primary-side start-up controller; a transformer having primary and secondary windings; a series-parallel resonant circuit that includes a primary winding of a transformer that may be coupled to the at least one power switch; a current measurement circuit for measuring current through the primary winding of the transformer and providing the measured primary winding current to the primary-side start-up controller; a secondary-side rectifier coupled to the transformer secondary winding for providing a second DC voltage; a secondary-side controller coupled to the primary-side start-up controller and the secondary-side rectifier; wherein when the primary-side start-up controller may receive the first DC voltage it may start to control the at least one power switch on and off at a frequency higher than a resonant frequency of the series-parallel resonant circuit that may include the primary winding of a transformer; whereby a current may flow through the transformer primary, an AC voltage may develop across the transformer secondary winding, a second DC voltage from the secondary side rectifier may power up the secondary-side controller, and the secondary-side controller may take over control of the at least one power switch from the primary-side start-up controller when the second DC voltage may reach a desired voltage level.

According to a further embodiment, the at least one power switch may be at least one power metal oxide semiconductor field effect transistor (MOSFET). According to a further embodiment, the secondary-side controller may be coupled to and may control the primary-side start-up controller through an isolation circuit. According to a further embodiment, the isolation circuit may be an optical coupler. According to a further embodiment, the isolation circuit may be a pulse transformer.

According to a further embodiment, the start-up controller may comprise: a voltage regulator having an input and an output; internal bias voltage circuits that may be coupled to the voltage regulator output; an under voltage lockout circuit coupled to the voltage regulator output; an over voltage lockout circuit that may be coupled to the voltage regulator output; a voltage controlled oscillator (VCO) and logic circuits that may generate a variable frequency control signal; a fixed off-time circuit may be coupled to the VCO and logic circuits; a power driver may be coupled to the VCO and logic circuits and may provide the variable frequency control signal to the at least one power switch; an external gate command detection circuit may be adapted to receive an external control signal, wherein when the external control signal may be detected the external gate command detection circuit may cause control of the at least one power switch to change from the logic circuits to the external PWM control signal; and a voltage comparator may have an output coupled to the VCO and logic circuits for detecting over current through the transformer primary winding.

According to a further embodiment, a blanking circuit may be coupled between the current sense input and the voltage comparator input. According to a further embodiment, a start-up frequency may be determined by a capacitance value of a capacitor. According to a further embodiment, a slew rate of the start-up frequency may be determined by a resistance value of a resistor. According to a further embodiment, the primary-side start-up controller may comprise an open-loop voltage controlled oscillator (VCO) and power switch driver. According to a further embodiment, the secondary-side controller may comprise a microcontroller.

BRIEF DESCRIPTION OF THE DRAWINGS

A more complete understanding of the present disclosure may be acquired by referring to the following description taken in conjunction with the accompanying drawings wherein.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein.

DETAILED DESCRIPTION

According to various embodiments of this disclosure, a series-parallel resonant power converter may comprise a primary-side start-up controller and a secondary-side controller, wherein the primary-side start-up controller is utilized to send power to the secondary-side controller when power (voltage) is first applied to the primary side of the series-parallel resonant power converter. The primary-side start-up controller may be used for starting up the series-parallel resonant power converter using an open-loop start-up technique wherein the secondary-side closed-loop controller takes over linear, closed-loop control of the series-parallel resonant power converter once it becomes powered and activated.

This provides a low cost integrated circuit (IC) solution for start-up of DC-to-DC and AC-to-DC series-parallel resonant power converters using conventional devices on the primary side that does not duplicate the resources of a secondary-side controller and minimizes discrete components on the primary side. More detailed descriptions of the implementation and operation of power converters, according to the teachings of this disclosure, are provided in commonly owned U.S. patent application Ser. No. 14/945,729; filed Nov. 19, 2015; entitled "Start-Up Controller for a Power Converter," by Thomas Quigley, and is hereby incorporated by reference herein for all purposes.

Series-parallel resonant power converters comprise topologies that have become quite popular recently. These series-parallel resonant power converter topologies provide low-cost conversion of medium range power (e.g., 150 watt to 300 watt power converters) with inherent zero-voltage switching (ZVS) and/or zero-current switching (ZCS) of the power switching metal oxide semiconductor field effect transistors (MOSFETs) SFETs) used therewith. Series-parallel resonant power converters require a control method that is different from the techniques used in pulse width modulation (PWM) controlled power converters, e.g., U.S. patent application Ser. No. 14/945,729 referenced hereinabove. The controller for a series-parallel resonant power converter produces a nearly-fixed duty cycle waveform with a dead time that is short and remains fixed as the switching period varies. This switching waveform varies in frequency in order to regulate the output of the series-parallel resonant power converter.

The "LLC" designation of the series-parallel resonant power converter describes the resonant "tank" circuit configuration, it being a series circuit consisting of a resonant inductors (LR), a resonant capacitor (CR), and the output transformer's magnetization inductance (LMAG). The load is essentially in parallel with LMAG. As the load approaches a short circuit the resonant frequency of the tank circuit is a function of LR and CR. As the load approaches an open circuit the resonant frequency of the tank circuit is a function of (LR+LMAG) and CR. The controller drives the series-parallel resonant power converter at a frequency greater than the resonant frequency of the tank. At the lower frequencies of that range the tank circuit offers lower impedance allowing greater power to be delivered to the load. At the higher frequencies of that range the tank circuit offers higher impedance allowing less power to be delivered to the load. By maintaining a switching frequency above the tank's resonant frequency (and maintaining a sufficient "Q" of the tank circuit) the converter naturally achieves zero-voltage switching of the power MOSFET switches. The LCC power converter is similar in operation to the LLC power converter but uses an additional capacitor in parallel with LMAG and the load.

A start-up method for a series-parallel resonant power converter utilizes a primary-side controller that becomes active upon application of the AC or DC line voltage, provides the MOSFET gate driving waveforms starting at a selected switching frequency above the resonant frequency of the series-parallel resonant power converter that allows low power to the secondary to establish secondary-side bias. As an option, the start-up method could slowly, in an open-loop manner, reduce the initially selected switching frequency toward the resonant frequency thereof. This allows the initial low power to the secondary to increase, in a soft-start manner, until a secondary-side controller can become active and assume control of the MOSFET power switch(es).

Referring now to the drawings, the details of example embodiments are schematically illustrated. Like elements in the drawings will be represented by like numbers, and similar elements will be represented by like numbers with a different lower case letter suffix.

Figure 1:
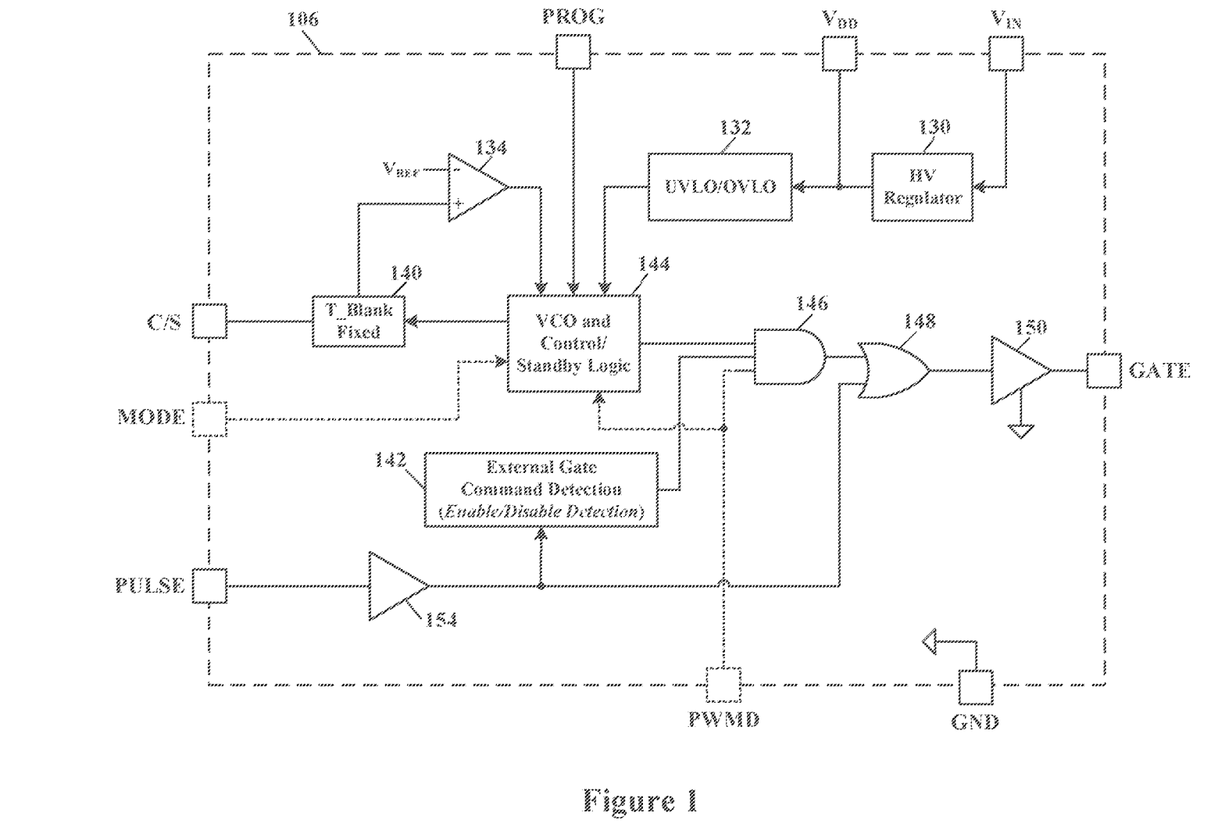
FIG. 1 illustrates a schematic block diagram of a start-up controller for a series-parallel resonant power converter, according to specific example embodiments of this disclosure.

Referring now to FIG. 1, depicted is a schematic block diagram of a start-up controller for a series-parallel resonant power converter, according to specific example embodiments of this disclosure. The start-up controller 106 may comprise a high voltage (HV) voltage regulator 130, under and over voltage lockout (UVLO/OVLO) circuits 132, a voltage comparator 134, a fixed blanking time circuit 140, an external gate command detection logic 142 (with optional enable/disable detection), a voltage controlled oscillator (VCO) and control/standby logic circuits 144, a three input AND gate 146, an OR gate 148, a MOSFET gate driver 150, and a signal buffer 154.

A capacitor 248 (FIG. 2) may be coupled between the PROG node (pin) of the start-up controller 106 and ground may be used to determine the initial start-up frequency. The resistor value 208 (FIG. 2) coupled between the MODE node (pin) of the start-up controller 106 and ground may determine the rate that the initial start-up frequency decreases (no resistor, no decrease in frequency). The primary current of transformer 230 (FIG. 2) is monitored at the input node C/S (current sense) (C/S monitors the voltage drop across resistor 214) of the start-up controller 106 for peak current protection using the voltage comparator 134 and a fixed voltage reference, $V_{REF}$. The fixed blanking time circuit 140 preventing false over current tripping due to turn-on current spikes during power switching.

Figure 2:
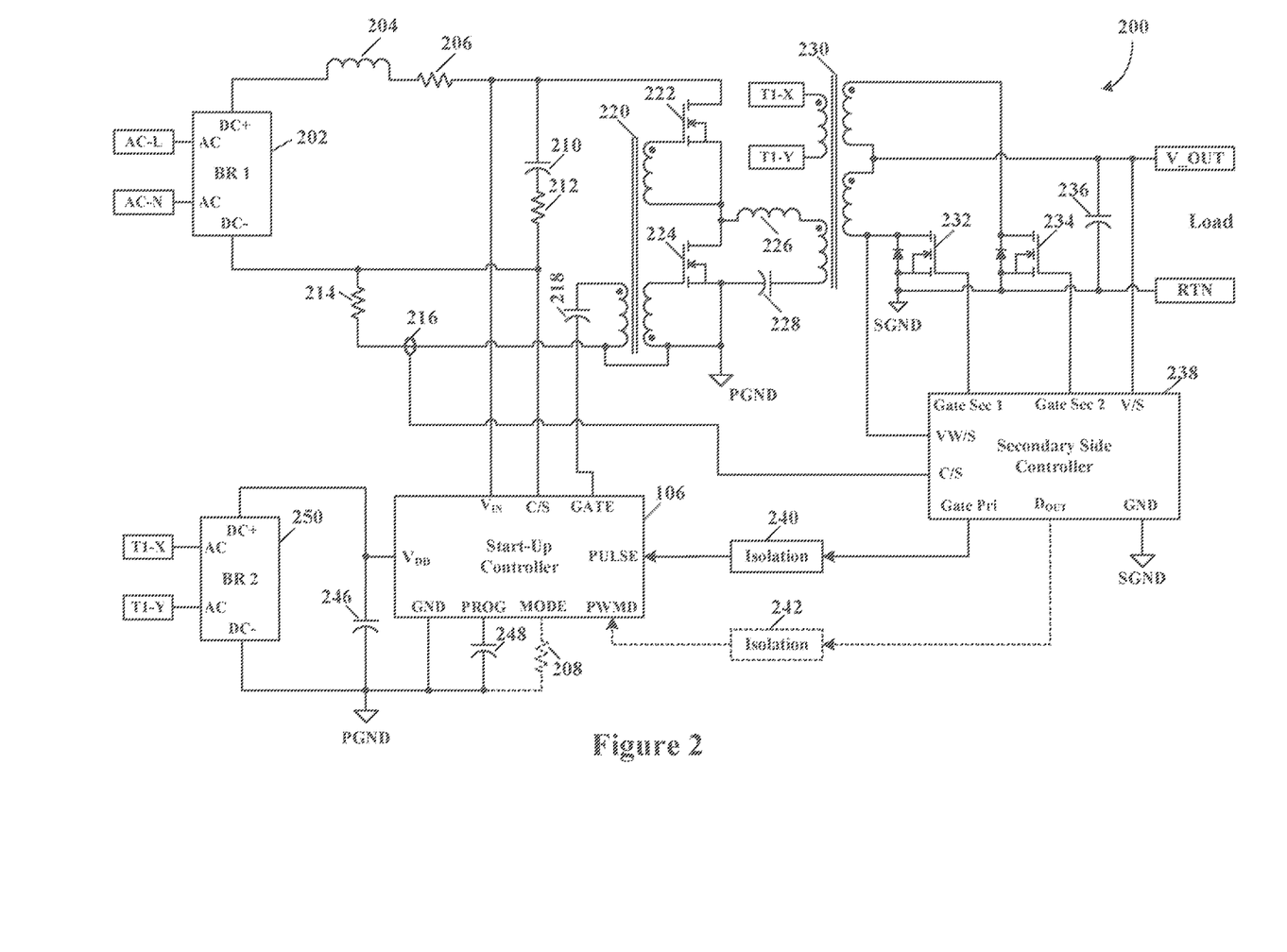
FIG. 2 illustrates a schematic block diagram of a series-parallel resonant power converter that uses the start-up controller shown in FIG. 1, according to specific example embodiments of this disclosure.

Referring now to FIG. 2, depicted is a schematic block diagram of a series-parallel resonant power converter that uses the start-up controller shown in FIG. 1, according to specific example embodiments of this disclosure. A series-parallel resonant power converter, generally represented by the numeral 200, may comprise a primary side bridge rectifier 202 (coupled to an AC line power source (not shown)), filter inductor 204 and filter capacitor 210 (with filter dampening resistor 206), resonant inductor 226 and resonant capacitor 228, capacitors 218, 236, 246 and 248; resistors 208, 214 and 244; transformers 220 and 230 (and current transformer 216), MOSFET power switches 222, 224, 232 and 234; a bridge rectifier 250 coupled to the T1 winding of transformer 230 for primary-side bias; a primary-side start-up controller 106, a secondary-side controller 238, and first and second isolation circuits 240 and 242, respectively, coupled between the primary-side start-up controller 106 and the secondary-side controller 238. The series-parallel resonant power converter 200 provides regulated voltage to an application load (not shown, but located across V_OUT and RTN) after start-up. The AC line power source may be in a universal range of from about 85 to 265 volts alternating current (AC) at a frequency of from about 47 Hz to about 63 Hz. It is contemplated and within the scope of this disclosure that the embodiment disclosed herein may be adapted for other voltages and frequencies. A DC source may be used instead of using the primary side bridge rectifier 202 coupled to an AC source.

The logic of the VCO and control/standby logic circuits 144 determines that when the UVLO/OVLO circuit 132 indicates that VDD is within a proper operating voltage range the VCO of the VCO and control/standby logic circuits 144 produces drive waveforms starting at the frequency determined by the capacitor 248 coupled to the PROG node (pin) of the primary-side start-up controller 106, and, if a resistor 208 is coupled to the MODE node (pin) thereof, slowly (rate determined by resistance value of the resistor 208) reduces the drive waveform frequency. When the secondary-side controller 238 becomes active it monitors the secondary-side voltage at the V/S node (pin) thereof. When the output voltage level across capacitor 236, and monitored at node V/S, reaches a desired value the secondary-side controller 238 may command the start-up controller 106 to stop switching by pulling down the PWMD node (pin) via the isolation circuit 242, e.g., optical coupler, pulse transformer, etc. If the secondary-side controller 238 decides to again apply power to the secondary of the transformer 230, it releases the logic low at the PWMD node. This release is detected by the VCO and control/standby logic circuits 144 and the VCO (144) thereof drives the gate driver 150, again starting from the highest frequency. This is a hysteretic "burst mode" type operation, providing just enough power to the secondary to keep the secondary-side controller 238 active (a low standby power state of operation). When the secondary-side controller 238 decides to apply power to the load, it can take control of the gate drive 150 by providing drive waveforms to the gate driver 150 via the PULSE node of the primary-side controller 106. When an external drive signal is detected at the PULSE node with the external gate command detection circuit the gate driver 150 receives pulse commands from the buffer 154 coupled to the PULSE node (instead of from the VCO of circuits 144) as long as the ULVO/OVLO circuit 132 determines that $V_{DD}$ is within the valid voltage levels.

The VCO and control/standby logic circuits 144 also monitors the state of the current sense comparator 134. The over-current trip level set point is a function of the internal voltage reference $V_{REF}$ and the choice of current sense resistor 214 value. If an over-current is detected, whether the gate drive 150 is being commanded internally or externally, the logic circuit 144 will momentarily interrupt commands to the gate driver 150. After the interrupt time interval, the gate drive 150 will either resume being commanded externally, or the VCO and control/standby circuits 144 will then start providing a drive waveform beginning at the frequency determined by the programming capacitor 248.

During offline operation (no load connected), the start-up sequence may be as follows:

1) AC line voltage is applied developing a DC voltage across capacitor 210.
2) Capacitor 246 is charged via the HV regulator 130. When the voltage at the $V_{DD}$ node of the start-up controller 106 meets the UVLO threshold of the ULVO/OVLO circuit 132 it becomes active.
3) The MOSFET gate driver 150 drives MOSFET power switches 222 and 224 via gate drive transformer 220 based on commands from the VCO 144. The drive frequency may be based on the value of the frequency programming capacitor 248 coupled to the PROG node and the resistance of the resistor 208 coupled to the MODE pin of the start-up controller 106. The drive waveform starts at a frequency selected by the capacitor 248 and slowly start reducing in frequency based on the resistance value of the resistor 208.
4) The MOSFET power switches 222 and 224 drive the resonant tank circuit comprising inductor 226, capacitor 228 and the output transformer 230 (which contains LMAG), charging capacitor 236. No load, other than the secondary-side controller 238 is present across capacitor 236.
5) When the voltage on capacitor 236 reaches a sufficient level the secondary-side controller 238 becomes active. The secondary-side controller 238 may be entirely analog, or entirely digital, or a combination of both.
6) The secondary-side controller 238 regulates the voltage across capacitor 236, sensed at its V/S node, in this low-power standby mode (no load applied) using hysteresis. Hysteretic control is accomplished by turning on and off The $D_{OUT}$ output from the secondary-side controller 238 which is coupled to the isolation circuit 242 to the PWMD input of the start-up controller 106. When $D_{OUT}$ output is turned on it causes the PWMD node to go to a low level, which inhibits signals from the VCO 144 of the start-up controller 106 to its gate driver 150. When $D_{OUT}$ is turned off, the PWMD node no longer is pulled down to a low logic level, whereby the gate driver 150 resumes accepting commands from the VCO of circuits 144, wherein the VCO of circuits 144 is reset to the frequency selected by the capacitor 248 and begins to slew lower in frequency at a rate determined by the resistance of the resistor 208. If resistor 208 is not utilized (present), then the frequency remains fixed and does not slew lower.
7) When the secondary-side controller 238 couples the load to the output of the power converter 200, the secondary-side controller 238 takes command of the gate driver 150 from the VCO 144. This is accomplished by providing the gate drive command to the PULSE input node of the start-up controller 106 from the Gate primary output of the secondary-side controller 238 via the isolation circuit 240.
8) The secondary-side controller 238 may have the following features:
   a. The VW/S input node may be used to monitor the secondary winding voltage of transformer 230. This feature may be used so that the secondary-side controller 238 can synchronize driving the synchronous rectifiers 232 and 234 in the correct phase with the waveform polarity from the gate driver 150 of the start-up controller 106.
   b. The secondary-side controller 238 may drive both of the primary-side MOSFETs 222 and 224 via the isolation circuit 240 to control the gate driver 150 and provide two gate drives for the synchronous rectifiers 232 and 234 on the secondary side of the transformer 230.
   c. The secondary-side controller 238 may monitor the primary current through transformer 230 (as well as any cross-conduction through power switches 222 and 224) via current transformer 216 monitored at its C/S node.

The secondary-side controller 238 may contain an internal VCO generator (not shown) to generate the variable frequency gating signal sent to the start-up controller 106 via the isolation circuit 240. This signal maintains a nearly 50 percent duty cycle with a programmable fixed dead-time period. This signal varies in frequency (over the valid frequency range) in order to control the impedance of the resonant tank circuit in order to regulate the output voltage when under load (linear control of the output voltage). The MOSFET power switches 222, 224, 232 and 234, commanded by the VCO of secondary-side controller 238, may turn on and off at zero voltage switching (ZVS) and/or zero current switching (ZCS) which is inherent to resonant converter topologies.

When the load on power converter 200 becomes light and approaches a no load condition the secondary-side controller 238 will no longer be able to regulate the voltage at its V/S node in a linear fashion. The secondary-side controller 238 will then have to resort to a "burst mode" type of control. "Burst mode" means the PWM signals occur for brief moments of time between times of no switching activity. If the "time of no switching activity" is too long the start-up controller 106 will think the secondary-side controller 238 has become inactive and it will switch to a start-up mode. Therefore the secondary-side controller 238 uses the PWMD node of the start-up controller 106 (via driving Isolator 242) to control the duration of the "time of no switching activity". When the secondary-side controller 238 releases the PWMD port it can decide whether the PWM signals are produced by the secondary-side controller 238 (delivered via Isolator 240) or generated by the start-up controller 106.

"Sleep" mode is also a "burst mode" type of operation. A difference is that in "sleep" mode the controllers go into an internal lower-power state, where there is an advantage not to continuously drive Isolator 242 to maintain "sleep" (for the purpose of much longer periods of times with no switching activity, resulting in extremely low power drawn from the input source). Another difference is that in "sleep" mode the secondary-side controller 238 is no longer trying to accurately regulate the voltage on the V/S node of the secondary-side controller 238, and instead only loosely regulates the voltages on its V/S node and on the VDD node of the start-up controller 106 such that the two controllers 106 and 238 can maintain their internal lower-power states. The secondary-side controller 238 either internally decides to enter "sleep" mode, or it is externally commanded by a higher level system controller. In order for the secondary-side controller 238 to command the start-up controller 106 to "sleep" it sends a coded message via isolator 242 which latches start-up controller 106 into sleep and thereby makes it possible to remain in "sleep" without continuously driving isolator 242, reducing power consumption. There are three methods to exit the "sleep" state (to wake the power converter 200). The first is for the secondary-side controller 238 to start sending PWM commands to the start-up controller 106 via isolator 240. The second is for the secondary-side controller 238 to send a single PWM pulse to the start-up controller 106 via isolator 240 which commands the start-up controller 106 into start-up mode. The third is caused by the voltage on the VDD node of start-up controller 106 decaying below the UVLO threshold causing the start-up controller 106 to enter the start-up mode. "Sleep" mode is fully described in commonly owned and co-pending U.S. patent application Ser. No. 15/168,390, filed May 31, 2016, entitled "Reducing Power in a Power Converter When in a Standby Mode," by Thomas Quigley, and is hereby incorporated by reference herein for all purposes.

The aforementioned U.S. patent application Ser. No. 15/168,390, also describes that it may be possible to transmit the encoded "sleep" command from the secondary-side controller 238 to the start-up controller 106 via Isolator 240. If a particular design of a power converter 200 allows for embedding the "sleep command" in the PWM signal path via isolator 240, this then allows for the elimination of isolator 242 and the PWMD node from the start-up controller 106 resulting in reduced cost and complexity of a power converter 200 design without any loss of "burst mode" control features as previously described.

Figure 3:
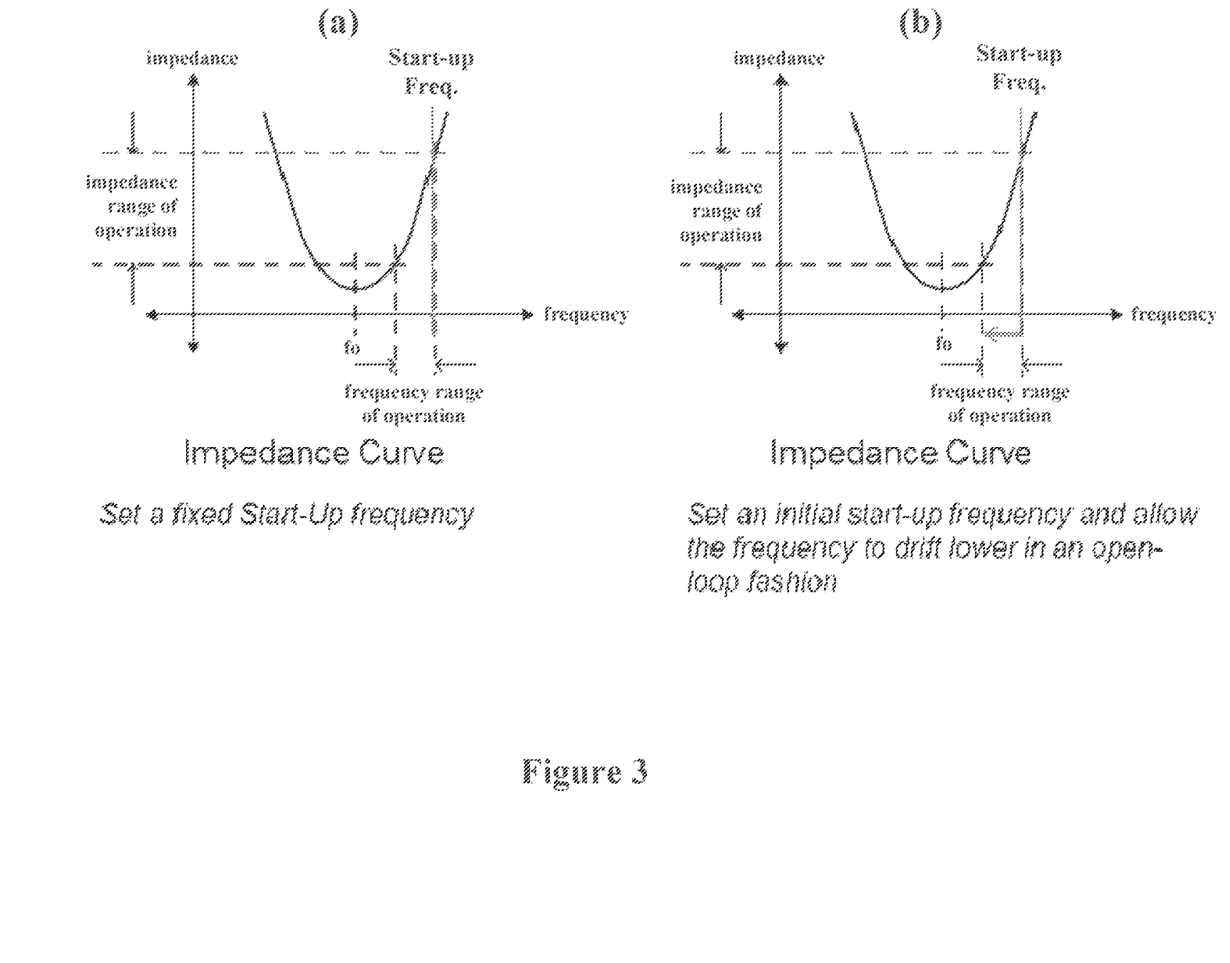
FIG. 3 illustrates schematic frequency-impedance graphs of the operation of a series-parallel resonant power converter, according to specific example embodiments of this disclosure.

Referring now to FIG. 3, depicted are schematic frequency-impedance graphs of the operation of a series-parallel resonant power converter, according to specific example embodiments of this disclosure. FIG. 3(a) shows a fixed start-up frequency at a high impedance point of the power converter 200 impedance curve. FIG. 3(b) shows a start-up frequency at a high impedance point of the power converter 200 impedance curve while drifting lower in frequency in an open-loop fashion. These graphs are representative of a family of frequency-impedance graphs, as the resonant frequency transitions from a function of "CR and LR" (heavy loading) to a function of "CR and (LR+LMAG) (light loading). The impedance is lowest at the resonant frequency $f_0$. Both the LLC Converter and the LCC Converter are able to operate in a frequency range higher than $f_0$. It is desirable to operate in a frequency range higher than $f_0$ in order to achieve Zero Voltage Switching (ZVS). The higher frequencies in the range are most suitable for start-up because it provides low power (higher impedance) to the output. The start-up frequency may be determined by the capacitance value of capacitor 248 coupled to the 'PROG" node of the start-up controller 106. MODE allows for two methods of start-up, one being where the start-up frequency remains fixed as shown in FIG. 3(a), and the other being where the start-up frequency starts high (as determined by the capacitor 248 on PROG), and then, in an open loop fashion, slowly lowers the switching frequency which increases the power (by lowering the impedance) delivered to the secondary during start-up as shown in FIG. 3(b). It should be noted that the LLC Converter and the LCC Converter both can either work in a frequency range lower than the resonant frequency $f_0$ or higher than $f_0$. The benefit of working at a range higher than $f_0$ is ZVS. The PROG feature of start-up controller 106, which sets the start-up frequency, can be used whether the converter operates in a frequency range above $f_0$ or below $f_0$. However a different version of start-up controller 106 would be needed for a converter operating in a frequency range below $f_0$ if the MODE feature was desired. In this case the MODE feature would, in an open loop fashion, slowly raise the switching frequency which increases the power (by lowering the impedance) delivered to the secondary during start-up.

Referring back to FIG. 2, inductor 226 and capacitor 228 make up the resonant tank circuit which is the frequency-dependent impedance described in FIG. 3. This resonant tank circuit provides impedance between the input source to power converter 200 and the load on the converter's output. This tank circuit is essentially in series with transformer 230. Therefore whenever MOSFETs 222 or 224 (and their respective synchronous rectifier MOSFETs 232 and 234) are ON the voltage across transformer 200's primary winding is a reflection of power converter 200's output voltage as is the voltage across transformer 200's tertiary winding (designated by terminals T1-X and T1-Y). The voltage on the tertiary winding is rectified by bridge rectifier 250 to provide bias to the start-up controller 106 at its VDD port. In FIG.

1 it is shown that the voltage at the VDD port is monitored by the start-up controller 106's UVLO/OVLO 132 circuit block. Therefore it is possible for the start-up controller 106 to monitor the output voltage of the power converter 200 for overvoltage and provide protection. This is an important feature. The start-up controller 106 is an open-loop method of starting up a series-parallel converter and depends on the secondary-side controller 238 becoming active during start-up and gaining linear control of power converter 200's output voltage before an output overvoltage occurs. However, if the secondary-side controller 238 fails to operate correctly the start-up controller 106 can provide overvoltage protection by monitoring the output voltage via transformer 230 cross-coupling and provide hysteretic regulation of the output voltage using the UVLO/OVLO 132 circuit block. This overvoltage protection method is similar to the method more fully described in co-pending U.S. patent application Ser. No. 14/945,729; previously incorporated herein by reference above.

The invention claimed is:

1. A method for starting up a series-parallel resonant power converter, said method comprising during starting up of the series-parallel resonant power converter:
    applying a first DC voltage to a primary-side start-up controller;
    turning on and off at least one power switch with the start-up controller at a frequency higher than a resonant frequency of a series-parallel resonant circuit that includes a primary winding of a transformer that is coupled to at least one power switch;
    reducing the on and off frequency of the at least one power switch toward the resonant frequency of the series-parallel resonant circuit during said starting up, whereby an AC voltage is produced on a secondary winding of the transformer;
    rectifying the AC voltage from the secondary winding of the transformer with first rectifiers to provide a second DC voltage for powering a secondary-side controller and a load; and
    transferring control of the at least one power switch from the primary-side start-up controller to the secondary-side controller when the second DC voltage is at a desired voltage value.

2. The method according to claim 1, wherein the step of turning on and off the at least one power switch with the start-up controller is within a frequency range that lies above said resonant frequency.

3. The method according to claim 2, wherein the step of turning on and off the at least one power switch with the start-up controller is controlled to drift to a lower end of said frequency range.

4. The method according to claim 1, wherein the step of turning on and off the at least one power switch with the start-up controller starts at a fixed higher frequency and changes to a lower frequency.

5. The method according to claim 1, wherein the step of turning on and off the at least one power switch with the start-up controller starts at a fixed lower frequency and changes to a higher frequency.

6. The method according to claim 1, wherein the step of transferring control of the at least one power switch from the primary-side start-up controller to the secondary-side controller comprises steps of:
    sending signals from the secondary-side controller to the primary-side start-up controller when the second DC voltage is at the desired voltage value;
    detecting signals from the secondary-side controller with the primary-side start-up controller; and
    controlling the at least one power switch with the detected signals from the secondary-side controller.

7. The method according to claim 6, wherein the second DC voltage is regulated by the secondary-side controller after the primary-side start-up controller detects the signals from the secondary-side controller.

8. The method according to claim 6, wherein the step of sending signals from the secondary-side controller to the primary-side start-up controller further comprises the step of sending signals through an isolation circuit.

9. The method according to claim 8, wherein the isolation circuit comprises an optical coupler.

10. The method according to claim 8, wherein the isolation circuit comprises a pulse transformer.

11. The method according to claim 1, further comprising a step of applying AC power to a second rectifier for providing the first DC voltage.

12. The method according to claim 1, further comprising a step of measuring current of the primary winding of the transformer with a current transformer coupled to a current sense input of the secondary-side controller.

13. The method according to claim 1, further comprising a step of limiting a maximum allowable transformer primary winding current with the primary-side start-up controller.

14. The method according to claim 1, wherein the first rectifiers are synchronous rectifiers.

15. The method according to claim 14, wherein the synchronous rectifiers switch at zero voltage.

16. The method according to claim 14, wherein the synchronous rectifiers switch at zero current.

17. The method according to claim 1, wherein the at least one power switch is at least one power metal oxide semiconductor field effect transistor (MOSFET).

18. The method according to claim 1, wherein the series-parallel resonant circuit comprises one inductor, one capacitor and the primary winding of the transformer in a LLC power converter configuration.

19. The method according to claim 1, wherein the series-parallel resonant circuit comprises two capacitors, one inductor and the primary winding of the transformer in a LCC power converter configuration.

20. The method according to claim 1, further comprising the steps of:
    sending a disable signal from the secondary-side controller to the primary-side start-up controller for inhibiting operation of the power switch when the series-parallel resonant power converter is entering a standby mode; and
    sending an enable signal from the secondary-side controller to the primary-side start-up controller for enabling operation of the power switch when the series-parallel resonant power returns to an operating mode.

21. The method according to claim 20, wherein the disable signal comprises a first coded signal and the enable signal comprises a second coded signal, wherein the primary-side start-up controller comprises decoding logic for decoding the first and second coded signals.

22. The method according to claim 20, wherein the enable and disable signals are at higher frequencies than pulse control frequencies from the secondary-side controller.

23. The method according to claim 1, wherein a step of turning on and off the at least one power switch with the start-up controller further comprises the step of generating a bias voltage from a bias winding of the transformer.

24. The method according to claim 1, wherein a step of transferring control of the at least one power switch from the primary-side start-up controller to the secondary-side controller comprises the step of the start-up controller accepting switching commands from the secondary-side controller so that the secondary-side controller controls the at least one power switch using the start-up controller in order to achieve substantially linear voltage regulation.

25. The method according to claim 1, wherein the step of turning on and off at the least one power switch with the start-up controller comprises the step of turning on and off the at least one power switch when the start-up controller is in an open loop mode.

26. The method according to claim 1, wherein the start-up controller provides over-voltage and under-voltage protection, and a maximum current limit through the transformer primary winding.

27. The method according to claim 1, wherein a tertiary winding voltage from the transformer is coupled to the start-up controller and enables the start-up controller to regulate the secondary-side voltage in an event the secondary-side controller fails to operate correctly.

28. A series-parallel resonant power converter, comprising:
 a primary-side start-up controller coupled to a first DC voltage;
 at least one power switch coupled to the primary-side start-up controller;
 a transformer having primary and secondary windings;
 a series-parallel resonant circuit that includes a primary winding of a transformer that is coupled to the at least one power switch;
 a current measurement circuit for measuring current through the primary winding of the transformer and providing the measured primary winding current to the primary-side start-up controller;
 a secondary-side rectifier coupled to the transformer secondary winding for providing a second DC voltage;
 a secondary-side controller coupled to the primary-side start-up controller and the secondary-side rectifier;
 wherein during start-up of the series-parallel resonant power converter:
  the primary-side start-up controller is configured to receive the first DC voltage and to start to control the at least one power switch on and off at a frequency higher than a resonant frequency of the series-parallel resonant circuit that includes the primary winding of a transformer;
 whereby
  a current flows through the transformer primary winding,
  an AC voltage develops across the transformer secondary winding,
  a second DC voltage from the secondary side rectifier powers up the secondary-side controller, and
  the secondary-side controller takes over control of the at least one power switch from the primary-side start-up controller when the second DC voltage reaches a desired voltage level.

29. The power converter according to claim 28, wherein the at least one power switch is at least one power metal oxide semiconductor field effect transistor (MOSFET).

30. The power converter according to claim 28, wherein the secondary-side controller is coupled to and controls the primary-side start-up controller through an isolation circuit.

31. The power converter according to claim 30, wherein the isolation circuit is an optical coupler.

32. The power converter according to claim 30, wherein the isolation circuit is a pulse transformer.

33. The power converter according to claim 28, wherein the start-up controller comprises:
 a voltage regulator having an input and an output;
 internal bias voltage circuits coupled to the voltage regulator output;
 an under voltage lockout circuit coupled to the voltage regulator output;
 an over voltage lockout circuit coupled to the voltage regulator output;
 a voltage controlled oscillator (VCO) and logic circuits for generating a variable frequency control signal;
 a fixed off-time circuit coupled to the VCO and the logic circuits;
 a power driver coupled to the VCO and the logic circuits for providing the variable frequency control signal to the at least one power switch;
 an external gate command detection circuit adapted to receive an external control signal, wherein when the external control signal is detected the external gate command detection circuit causes control of the at least one power switch to change from the logic circuits to the external PWM control signal; and
 a voltage comparator having an output coupled to the VCO and the logic circuits for detecting over current through the transformer primary winding.

34. The power converter according to claim 33, further comprising a blanking circuit coupled between the current sense input and the voltage comparator.

35. The power converter according to claim 33, wherein a start-up frequency is determined by a capacitance value of a capacitor.

36. The power converter according to claim 35, wherein a slew rate of a start-up frequency is determined by a resistance value of a resistor.

37. The power converter according to claim 28, wherein the primary-side start-up controller comprises an open-loop voltage controlled oscillator (VCO) and power switch driver.

38. The power converter according to claim 28, wherein the secondary-side controller comprises a microcontroller.

39. The power converter according to claim 28, wherein the primary-side start-up controller is further configured to reduce the on and off frequency of the at least one power switch toward the resonant frequency of the series-parallel resonant circuit during said starting-up.

40. A method for starting up a series-parallel resonant power converter, said method comprising during starting up of the series-parallel resonant power converter:
 applying a first DC voltage to a primary-side start-up controller;
 during starting-up, turning on and off at least one power switch with the start-up controller at a frequency higher than a resonant frequency of a series-parallel resonant circuit that includes a primary winding of a transformer that is coupled to at least one power switch, whereby an AC voltage is produced on a secondary winding of the transformer;
 rectifying the AC voltage from the secondary winding of the transformer with first rectifiers to provide a second DC voltage for powering a secondary-side controller and a load; and
 transferring control of the at least one power switch from the primary-side start-up controller to the secondary-side controller when the second DC voltage is at a desired voltage value.

41. The method according to claim 40, wherein the step of turning on and off the at least one power switch with the start-up controller is within a frequency range that lies above said resonant frequency.

42. The method according to claim 41, further comprising the step of reducing the on and off frequency of the at least one power switch during said starting-up toward drift to a lower end of said frequency range.

* * * * *

UNITED STATES PATENT AND TRADEMARK OFFICE
CERTIFICATE OF CORRECTION

PATENT NO. : 10,277,130 B2
APPLICATION NO. : 15/168569
DATED : April 30, 2019
INVENTOR(S) : Thomas Quigley Page 1 of 1

It is certified that error appears in the above-identified patent and that said Letters Patent is hereby corrected as shown below:

On the Title Page

(73) Assignee:
"Microchip Technolgoy Incorporated, ..."
Change to:
"Microchip Technology Incorporated..."

Signed and Sealed this
Eleventh Day of June, 2019

Andrei Iancu
*Director of the United States Patent and Trademark Office*